Sept. 20, 1938.   H. E. HINES ET AL   2,130,623
EGG HANDLING DEVICE
Filed April 16, 1937
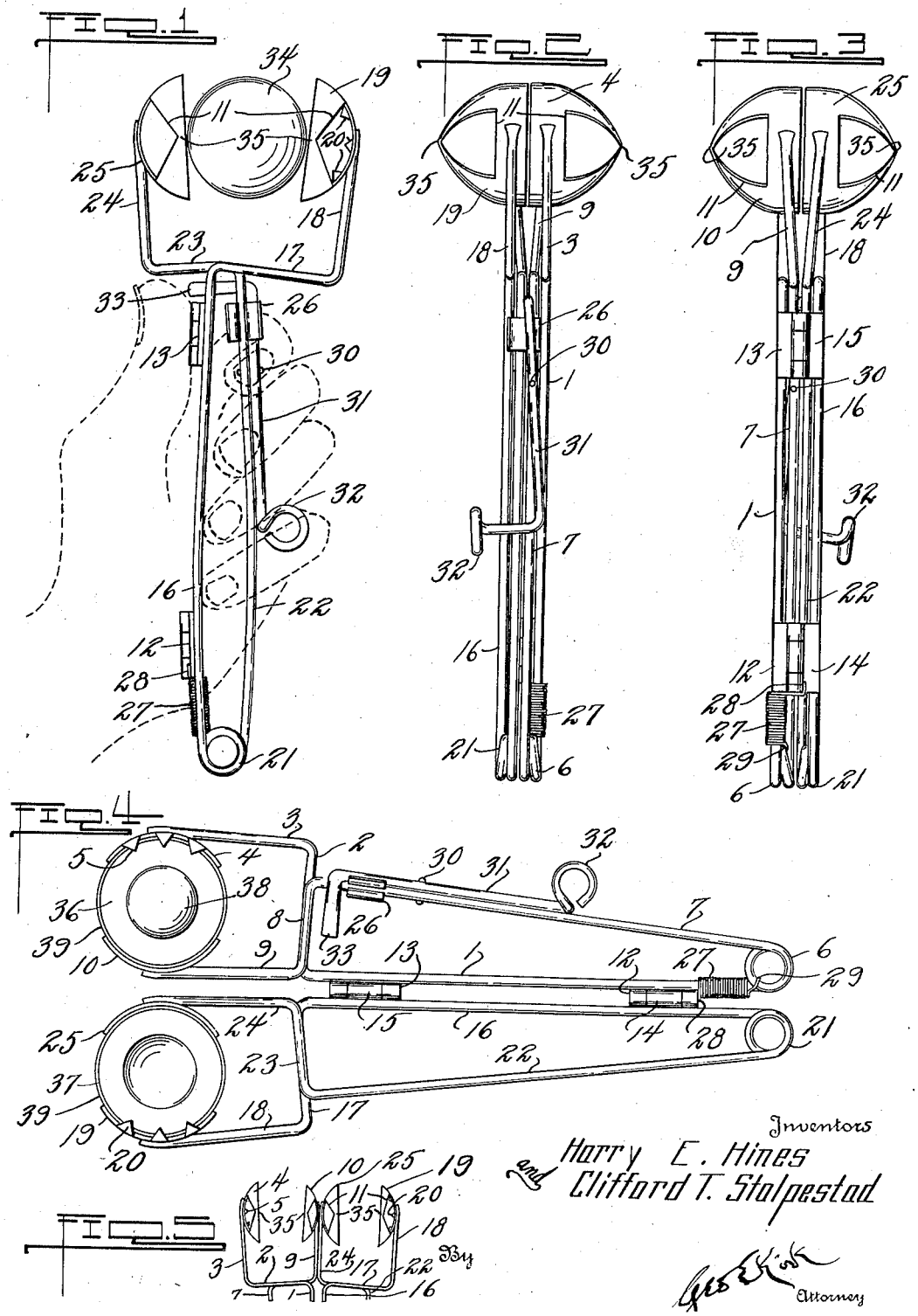
Inventors
Harry E. Hines
Clifford T. Stalpestad Patented Sept. 20, 1938

2,130,623

UNITED STATES PATENT OFFICE 2,130,623

EGG HANDLING DEVICE

Harry E. Hines and Clifford T. Stolpestad, Monroe, Mich.

Application April 16, 1937, Serial No. 137,205

10 Claims. (Cl. 146—2)

This invention relates to multiple control tongs or gripping devices.

This invention has utility when incorporated in culinary apparatus, especially for handling eggs in preparation for cooking, operations during cooking as boiling, and even to serving.

Referring to the drawing:

Fig. 1 is a view of the device in spread-tong position, say for receiving an egg, picking up such egg from a position as in a vessel of boiling water;

Fig. 2 is a view of the device in normal or closed position from the right of Fig. 1;

Fig. 3 is a view of the device from the left of Fig. 1;

Fig. 4 is a view of the device in spread position from the showing in Fig. 1, say as containing a hard boiled shell egg; and Fig. 5 is a fragmentary view showing the spread position inverted from the position of Fig. 4 to spill an egg therefrom with the respective sections spaced.

Herein the device is shown as comprising arm 1 having offset 2 to free terminus 3 carrying seat section 4 equipped at its major diameter portion with rim means 5 as egg shell cracking or severing means, which are further effective as retaining means for the egg portion as in the seat. This arm 1, remote from its free end, has torsion spring or coil portion 6 to arm 7, yieldably diverging from the arm 1 and equipped with offset 8, parallel to and opposite the offset 2, with free end 9 therefrom opposing the free end 3 and terminally carrying seat 10 complementary to the seat 4, which together form a pocket having openings 11 therein.

Fixed with the arm 1 are hinge leaves 12, 13, rockably connected to hinge leaves 14, 15, respectively. These hinge leave sections 14, 15, are fixed with arm 16, parallel to and similar to the arm 1. This arm 16 extends to offset 17 with free end 18 extending to seat portion 19 having teeth 20 as egg shell severing means similar to the portions 5 and normally in closed position approximately in abutting relation therewith. This arm 16, remote from its free end 18, has coil 21 adjacent to and similar to the coil 6 as a torsion spring, mounting arm 22 having offset 23 reversely from the offset 17 to mount free end 24 opposing free end 18 and there carrying seat section 25 similar to the seat section 10, and with the arm 22 swung on the hinges between the arms 1 and 16 to bring such arm 22 into adjacent position with the arm 7, and pocket 19, 25, open to pocket 4, 10.

Spring clip 26 is a catch for holding this assembly of the arms together in a grip or handle against resistance of torsion spring 27 having assembly for its spring terminus 28 as acting on the spring leaf 14 to throw such leaf 14 away from the spring leaf 12 in the torsion of the spring 27, as anchored against rotation by having its other end 29 engage in the coil 6.

Pin 30 in the arm 7 mounts trigger 31 having thumb eye 32 which may be pressed to throw this lever so that offset terminus 33 seating between the arms 7, 22, will thrust the arm 22 clear of the catch 26 and allow this torsion spring 27 to be effective in swinging the arm 22 away from the arm 7 to such extent as to approximately lie in a plane with the arms 1 and 16. This, with the holder or seat sections having the rim portions 5, 20, upward, leaves these as pocket forming means so that the one using the tool may complete the severing between the shell and white, in the event the egg be hard boiled, then invert in one position for the edible portions to be discharged. With the drawing of the arm 7 toward the arm 22 in the grip against the resistance of the torsion springs 6, 21, the section 10 moves away from the section 4 and the section 25 moves away from the section 19, thus effecting a spreading or release position for the shell.

In the operation hereunder with the grip in fully closed position so that the catch 26 on the arm 7 engages the arm 22, the one holding the tool at the grip or handle portion may compress the pair of arms 7, 22, toward the pair of arms 1, 16, thereby causing the section pair 10, 25, as a unit to move away from the section pair 4, 19, in these complementary sets of seat sections. As thus spread, this tong-like device may be brought into position about the article to be handled as an egg, whether raw, in process of soft boiling, or hard boiled, or otherwise as may be convenient. At this position there is pressure on the arms to be gradually released for these seats to come snugly around an egg 34. If this be a raw egg and the purpose is to lift such into boiling water, it is only necessary to insert the tong into the vessel and then repeat the pressure to release the egg into the water.

If the egg be one which it is desired to use raw, it is only necessary, as gripped, to give a slight tap to the free end portions of the arms, say in the region of the arms 3, 18. This at once causes the rim means 5, 20, not only to crack but to so fracture the shell as to medially sever the egg. The egg as thus cracked apart may be, as raw, readily dumped from this device by operating the trigger 31 at the thumb piece 32 with the seat section pairs opening downward so that points 35 are up. This would allow the white and yolks to readily drain, or if there be purpose in severing, the opening may be first with the sections right side up and the parts 35 down, to drain the yolk into one section away from the white and then sever the yolks from the whites.

In the event the operation be one with a boiled egg as removed by the tongs from the boiling water, this is readily done while the egg is hot without any discomfort to the user and with such egg whether hard or soft boiled, it may be at once placed in an egg cup or prepared for serving by slight knock to cause the teeth 5, 20, to effect medial cracking of the shell. Then with opening out, from operating the trigger 32, such may be for draining, if a soft boiled egg, at which position the points 35 would be upward; while if hard boiled, the white egg portions 36, 37, would be in the separate sections with yolk 38 possibly severed or medially in the different sections. For removal of this hard boiled egg, it might be desirable to take a knife or tool and run such around the outside of the white 36, 37, to sever between such and the shell 39. Reversal then would allow the egg to spill away from the retained shell, and thereafter the collapsing or slight movement of the arm 7 toward the arm 22 within the same plane of the arms 1, 16, will release the shell for dropping in a separate place from that of the edible portions.

What is claimed and it is desired to secure by Letters Patent is:

1. A hand tool comprising four relatively-movable arms in complementary pairs, a connecting hinge between two of said arms, of said remaining two arms one has terminal spring connection with one of said hinge connected arms and the other of said remaining arms has spring connection with the other hinge connected arm, there being a combined directing and control handle for the arms along the hinge away from the spring connections.

2. A hand tool comprising two pairs of relatively-movable arms having free ends, a connecting hinge between two of said arms, of said remaining two arms each has terminal spring connection with one of said hinge connected arms remote from the free ends, there being a directing handle for the arms having gripping control intermediate the free ends of the spring connections for effecting selected-pair relative-shifting movement thereof.

3. A hand tool comprising four relatively-movable arms each having a seat section free end, a connecting hinge between two of said arms, of said remaining two arms each has terminal spring connection with one of said hinge connected arms remote from the free ends, there being a spreadable handle for the tool intermediate the free ends of the spring connections releasable to shift one pair of said sections as a cup from an opposing pair of said sections as a closure for the cup.

4. A hand tool comprising four relatively-movable arms each having a seat section free end, four of said arms having torsion spring connection in two pairs away from the free ends and two of said arms having hinge connection between said two pairs, said arms as connected forming a tool grip along said hinge connection and between said free ends and said spring connections.

5. An egg handling tool comprising a plurality of relatively movable arms having a handle therewith providing four third class levers, there being hinge connection along the handle between a pair of said levers, said arms at their free ends having seat sections including egg shell severing means.

6. The tool of claim 1 wherein a pair of the arms have gripping termini.

7. The tool of claim 2 wherein the free ends of the arms have toothed termini.

8. The tool of claim 3 wherein the free ends of plurality of the arms may approach to provide an annular series of teeth.

9. An egg handling tool comprising a plurality of relatively movable arms having a handle therewith providing four third class levers, there being hinge connection lengthwise of the handle between a pair of said arms, said arms at their free ends having seat sections including egg gripping means.

10. The tool of claim 4, there being teeth portions at the free ends movable with the respective arms.

HARRY E. HINES.
CLIFFORD T. STOLPESTAD.